United States Patent [19]

Johnson et al.

[11] 4,175,175

[45] * Nov. 20, 1979

[54] POLYARYLENE POLYETHERS

[75] Inventors: Robert N. Johnson, New Market; Alford G. Farnham, Mendham, both of N.J.

[73] Assignee: Union Carbide Corporation, New York, N.Y.

[*] Notice: The portion of the term of this patent subsequent to Aug. 22, 1995, has been disclaimed.

[21] Appl. No.: 903,569

[22] Filed: May 8, 1978

Related U.S. Application Data

[60] Division of Ser. No. 230,091, Feb. 28, 1972, Pat. No. 4,108,837, which is a continuation-in-part of Ser. No. 688,302, Dec. 6, 1967, abandoned, which is a continuation-in-part of Ser. No. 446,715, Apr. 8, 1965, abandoned, which is a continuation-in-part of Ser. No. 295,519, Jul. 16, 1963, abandoned.

[51] Int. Cl.$^2$ ............................................. C08G 65/40
[52] U.S. Cl. .................................. 528/125; 528/126; 528/128; 528/219; 525/434
[58] Field of Search ............... 528/125, 126, 174, 219, 528/128

[56] References Cited

U.S. PATENT DOCUMENTS

3,622,541  11/1971  Darsow et al. .................. 528/219

FOREIGN PATENT DOCUMENTS

734196  12/1969  Belgium .................................. 528/219
2010401  2/1970  France .................................... 528/219
6408130  1/1965  Netherlands ........................... 528/219
6908408  12/1969  Netherlands ........................... 528/219

*Primary Examiner*—Lester L. Lee
*Attorney, Agent, or Firm*—Donald M. Papuga

[57] ABSTRACT

Polyarylene polyethers composed of recurring units

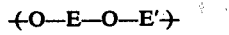

where E is the residuum of a dihydric phenol and E' is the residuum of a benzenoid compound having an inert electron withdrawing group ortho or para to the valence bonds and where both E and E' are bonded to the ether oxygens through aromatic carbon atoms. The polyarylene polyethers are prepared by reacting a double alkali metal salt of a dihydric phenol with a dihalobenzenoid compound in the presence of certain sulfoxide or sulfone solvents under substantially anhydrous conditions.

10 Claims, No Drawings

POLYARYLENE POLYETHERS

This application is a division of our prior U.S. application Ser. No. 230,091 filed Feb. 28, 1972, (now U.S. Pat. No. 4,108,837) which is a continuation-in-part of U.S. application Ser. No. 688,302 filed Dec. 6, 1967 (abandoned) which is a continuation-in-part of U.S. application Ser. No. 446,715 filed Apr. 8, 1965 and U.S. application Ser. No. 295,519 (both abandoned).

BACKGROUND

This invention relates to a class of organic polymers having etheric oxygen valently connecting together aromatic nuclei or residua of aromatic compounds. These polymers are appropriately termed polyarylene polyethers. More particularly, this invention relates to high molecular weight polyarylene polyethers as new polymers per se and to a method for the preparation of such polymers, which polymers are characterized by excellent high temperature resistance, toughness and stability.

Heretofore, temperature resistance of organic polymers has been a limiting factor to the broad use of polymers in end uses where high temperatures are encountered either intermittently or continuously. In fact only several known polymers are acceptable for use where ambient temperatures exceed 100° C., and the majority of these are thermoset products. Other thermoplastic resins known for use at such temperatures also create problems of handling, forming stability, or else are extremely expensive or difficult to prepare.

The need is obvious for a thermoplastic polymer that is relatively inexpensive, easy to extrude and form into shaped objects, and yet has excellent toughness, temperature resistance and form stability at elevated temperatures.

According to the present invention, it has now been discovered that high molecular weight polyarylene polyethers possess this combination of desirable properties.

SUMMARY

The high molecular weight polyarylene polyethers of the present invention are the linear thermoplastic reaction products of an alkali metal double salt of a dihydric phenol and a dihalobenzenoid compound. Characteristically, this polymer has a basic structure composed of recurring units having the formula

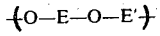

wherein E is the residuum of the dihydric phenol and E' is the residuum of the benzenoid compound, both of which are valently bonded to the ether oxygen through aromatic carbon atoms, as hereinafter more fully discussed. Polymers of this type exhibit excellent strength and toughness properties as well as outstanding thermal, oxidative and chemical stability. They find wide utility in the production of shaped and molded articles where such properties are necessary and are highly desirable and also in the preparation of film and fiber products which have excellent mechanical properties even in the unoriented condition. Orientation by conventional and known techniques even further improves these mechanical properties in providing films and fibers having strengths heretofore unobtainable in organic polymers.

The polyarylene polyethers of this invention are prepared by the substantially equimolar one-step reaction of a double alkali metal salt of a dihydric phenol with a dihalobenzenoid compound in the presence of specific liquid organic sulfoxide or sulfone solvents under substantially anhydrous conditions (Process I). Catalysts are not necessary for this reaction but the unique facility of these solvents to promote the reaction to a high molecular weight product has now provided the critical tool necessary to secure sufficiently high molecular weight aromatic ether products useful for services heretofore limited to such products as polyformaldehydes and polycarbonates.

In another aspect of this invention, the polymers are also prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed and after removing the water which is present or formed, in order to secure substantially anhydrous conditions, admixing and reacting about stoichiometric quantities of the dihalobenzenoid compound (Process II). Likewise, the same result is achieved by adding the alkali metal salt of the dihydric phenol in the solvent to the dihalobenzenoid compound either continuously, incrementally or all at once so as to achieve the polymerization reaction. Thus the reaction can readily be conducted in batch, semi-continuous, or continuous operation by the proper selection or adjustment of addition rate, reaction rate and temperature as is obvious to those skilled in the art from the present disclosure.

Yet another aspect of this invention involves a one-step process for preparing substantially linear, thermoplastic polyarylene polyethers by simultaneously contacting substantially equimolar amounts of an alkali metal double salt of a dihydric phenol and a dihalobenzenoid compound with a solvent mixture comprising an azeotrope former and a sulfoxide or sulfone reaction solvent in a weight ratio of from about 10:1 to about 1:1, preferably from about 4:1 to about 3:1, removing water from the reaction mass as an azeotrope with the azeotrope former until substantially anhydrous conditions are attained, adjusting the ratio of azeotrope former to reaction solvent from about 1:1 to about 1:10, preferably from about 1:3 to about 1:4, by removing excess azeotrope former, and reacting the alkali metal double salt with the dihalobenzenoid compound in the liquid phase of the sulfoxide or sulfone reaction solvent (Process IA).

In further embodiment of this invention, polyarylene polyethers are prepared by a two-step process wherein substantially equimolar amounts of a dihydric phenol, rather than the alkali metal double salt thereof, and a dihalobenzenoid compound are simultaneously contacted with the solvent mixture as described above. The dihydric phenol is then converted in situ to the alkali metal double salt by reacting with about stoichiometric amounts of the alkali metal, the alkali metal hydride, alkali metal hydroxide, alkali metal alkoxide or the alkali metal alkyl compounds. Thereafter water is removed, the solvent ratio adjusted and the monomers reacted as in the one-step process described above (Process IIA).

The polymerization reaction proceeds in the liquid phase of a sulfoxide or sulfone organic solvent at elevated temperatures as hereinafter more fully set forth.

While it has been found that the alkali metal salt of the dihydric phenol has only limited solubility in these solvents, this feature provides for easy control of the reaction and if desired, the slow addition of one reactant to the other to provide a satisfactory high molecular weight polymers.

The sulfoxide or sulfone solvents as heretofore mentioned are those of the formula

in which each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. Thus, in all of these solvents all oxygens and two carbon atoms are bonded directly to the sulfur atom. Thus, contemplated for use in this invention are such solvents as those having the formula

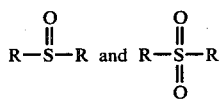

where the R groups are lower alkyl, such as methyl, ethyl, propyl, butyl and like groups and aryl groups such as phenyl and alkyl phenyl groups as well as those where the R groups are interconnected as in a divalent alkylene bridge such as

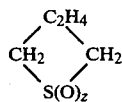

as in thiophene oxides and dioxides. Specifically mentionable of these solvents but by no means exhaustive of those solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide. The dimethylsulfoxide has been found to be the most useful as the solvent for this reaction because it is a solvent for the widest variety of reactants as well as for the resulting polymer of the reaction. Aliphatic unsaturation on the α carbon atom, such as occurs in divinyl sulfone and sulfoxide, should not be present as such materials tend to be reactive and polymerize under the conditions of this reaction. However, unsaturation on a β carbon atom or one further removed from the sulfur atom can be tolerated and such solvents can be employed in this reaction.

It is essential in the polymerization reaction that the solvent be maintained substantially anhydrous before and during the reaction. While amounts of water up to about one percent can be tolerated, and are somewhat beneficial when employed with fluorinated dihalobenzenoid compounds, amounts of water substantially greater than this are desirably avoided as the reaction of water with the dihalobenzenoid compound leads to formation of phenolic species and only low molecular weight products are secured. Owing to the nature of the polymerization reaction of the dihalobenzenoid compound with an equimolar amount of the alkali metal salt of the dihydric phenol, this upset of the necessary stoichiometric limits the molecular weight obtainable. Consequently, in order to secure the high polymers, the system should be substantially anhydrous, and preferably with less than 0.5 percent by weight water in the reaction mixtures.

While such problems are essentially avoided when using the dry crystalline alkali metal salt of the dihydric phenol, as the one reactant, it is often more convenient to form the alkali metal salt in situ in the reaction solvent, and thus employ the two-step process described heretofore.

In situations where it is desired to prepare the alkali metal salt of the dihydric phenol in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture.

It has been found convenient to employ benzene, xylene, halogenated benzenes or other inert organic azeotrope-forming organic liquids in performing this. Heating the alkali metal hydroxide, dihydric phenol and small amounts of the azeotrope former to reflux for several hours while removing the azeotrope is the most desirable. However, it is obvious that any other technique for removing essentially all of the water can be equally satisfactory.

It is not essential and critical in this reaction that all of the azeotropic former be removed before the reaction of the alkali metal salt of the bisphenol with the dihalobenzenoid compound. In fact, it is desirable in some instances to employ an amount of such material in excess of that needed to azeotrope off all of the water, with the balance being used as a cosolvent or inert diluent with the sulfone or sulfoxide principal solvent. Thus, for instance, benzene, heptane, xylene, toluene, chlorobenzene, dichlorobenzene and like inert liquids can be beneficially employed.

The azeotrope former can be one either miscible or immiscible with the sulfone or sulfoxide major solvent. If it is not miscible it should be one which will not cause precipitation of the polymer in the reaction mass. Heptane is such a solvent. When employed, it will merely remain inert and immiscible in the reaction mass. If the azeotrope former would cause precipitation of the polymer, it should be removed almost completely from the reaction mass before initiating polymerization.

For such reasons, it is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former.

It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation. These materials are also completely stable to the alkali metal hydroxides employed in the in situ neutralization of the hydroxy groups of the dihydric phenol.

Any of the alkali metal hydroxides can be employed in this technique, that is to say any alkali metal salt of the dihydric phenol can be used as the one reactant. Potassium and cesium salts have been found to react considerably faster than the sodium salts, but do to expense of the cesium salts, the potassium salts are preferred. As heretofore indicated, the alkali metal salt should, of course, be the double metal salt, i.e. both aromatic hydroxyl groups being saponified, in order to prepare these products. Single metal salts ordinarily limit the molecular weight of the product. While this may be desirable as a chain terminator or molecular weight regulator near the terminus of the reaction period, the initial reaction and the major portion thereof should be with the double alkali metal salt of the dihydric phenol. The alkali metal moieties of this compound however can be the same or different alkali metals.

In processes IA and IIA substantially equimolar amounts of the alkali metal double salt of a dihydric phenol (or a dihydric phenol for in situ conversion to the salt) and a dihalobenzenoid compound are simultaneously contacted with a solvent mixture comprising an azeotrope former and a sulfoxide or sulfone reaction solvent in a ratio of from about 10:1 to about 1:1 by weight based on the combined weight of the azeotrope former and reaction solvent. It has been found that when water is present in this solvent mixture, a phase separation occurs even between normally miscible liquids creating two liquid phases. When this phase separation occurs, it has also been found that the water and hydrated alkali metal double salt of a dihydric phenol, discussed in more detail below, are preferentially dissolved in the sulfoxide or sulfone reaction solvent phase and the dihalobenzenoid compound is preferentially dissolved in the azeotrope former phase. The initial ratio of azeotrope former to reaction solvent is critical in this respect because with lesser amounts of azeotrope former, two liquid phases are not formed and undesirable hydrolysis of the dihalobenzenoid compound occurs. Only when the ratios specified are used does a phase separation occur which isolates the dihalobenzenoid compound from hydrolysis by the water in the system.

It should be noted that if dry crystalline alkali metal salt of a dihydric phenol is employed, problems relative to obtaining anhydrous conditions are essentially avoided. However, drying the salt and keeping it dry during transfer and charging is difficult. It has been found to be more advantageous to employ a hydrated alkali metal salt which is dehydrated in the reaction mass by removing the water of hydration. Water then can be present or formed in the reaction mass as the water of hydration of a hydrated alkali metal salt, as the water of neutralization formed during the in situ conversion of a dihydric phenol to the alkali metal double salt, or as water present in either the azeotrope former or the reaction solvent. It has been found that during the in situ conversion, the hydrated salt is formed first which is then dehydrated upon the removal of water.

In Processes IA and IIA, when the two liquid phases are formed, it is important that the water in the system be removed as quickly as possible, usually by refluxing the mixture at about the boiling point of the azeotrope former until substantially all of the water is removed. During the water removal, the dehydrated alkali metal double salt, which is insoluble in the reaction solvent at the reflux temperatures, precipitates. The fact that all the water has been removed is usually signaled by no further precipitate formation, no further azeotrope formation, and the formation of one liquid phase when miscible liquids are used.

After the water has been removed, excess azeotrope former is removed by distillation until the ratio of azeotrope former to sulfoxide or sulfone reaction solvent is about 1:1 to 1:10. Only when the amount of azeotrope former is reduced to within these ratios, does significant polymerization occur.

The residuum E of the dihydric phenol of these alkali metal salts is not narrowly critical. It can be, for instance, a mononuclear phenylene group as results from hydroquinone and resorcinol, or it may be a di- or polynuclear residuum. Likewise it is possible that the residuum be substituted with other inert nuclear substituents such as halogen, alkyl, alkoxy and like inert substituents.

From a practical standpoint, limitations on polymer molecular weights may be expected when the dihydric phenol or the alkali metal derivative thereof contain strong electron withdrawing groups. This may result in lower molecular weight polymers or impractically slow reaction rates. Hence, it is preferred that the dihydric phenol be a weakly acidic dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or the chlorinated derivatives containing one or two chlorines on each aromatic ring. While these halogenated bisphenolic alkanes are more acidic than the non-halogenated bisphenols and hence slower in reactivity in this process, they do impart valuable flame resistance to these polymers. Other materials also termed appropriately "bisphenols" are also highly valuable and preferred. These materials are the bisphenols of a symmetrical or unsymmetrical joining group, as for example, ether oxygen (—O—),

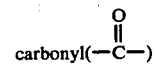

sulfide (—S—),

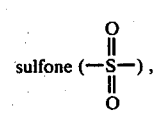

or hydrocarbon residue in which the two phenolic nuclei are joined to the same or different carbon atoms or the residue such as, for example, the bisphenol of acetophenone, the bisphenol or benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

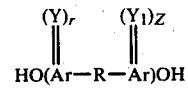

wherein Ar is an aromatic group and preferably, is a phenylene group, Y and $Y_1$ can be the same or different inert substituent groups as alkali groups having from 1 to 4 carbon atoms, halogen atoms, i.e. fluorine, chlorine, bromine or iodine, or alkoxy radicals having from 1 to 4 carbon atoms, r and z are integers having a value from 0 to 4, inclusive, and R is representative of a bond between aromatic carbon atoms as in dihydroxydiphenyl, or is a divalent radical, including for example, inorganic radicals as

—O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxylphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)-methane, bis(4-hydroxy-2,6-dimethyl-3-methoxyphenyl)methane, 1,1-bis-(4-hydroxyphenyl)ethane, 1,2-bis-(4-hydroxyphenyl)-ethane, 1,1-bis(4-hydroxy-2-chlorphenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)-propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)1,1,1,3,3,3-hexafluoropropane and the like;

di(hydroxyphenyl)sulfones such as bis-(4-hydroxyphenyl, sulfone, 2,4'-dihydroxydiphenyl sulfone, 5'-chloro-2,4'-dihydroxydiphenyl sulfone, 5'-chloro-4,4'-dihydroxydiphenyl sulfone, and the like.

di(hydroxyphenyl) ethers such as bis-(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis-(4-hydroxy-3-isobutylphenyl) ether, bis-(4-hydroxy-3-isopropylphenyl) ether, bis-(4-hydroxy-3-chlorophenyl ether, bis-(4-hydroxy-3-fluophenyl) ether, bis-(4-hydroxy-3-bromophenyl) ether, bis-(4-hydroxynaphthyl) ether, bis-(4-hydroxy 3-chloronaphthyl) ether, 4,4'-dihydroxy-3,6-dimethoxydiphenyl ether, 4,4'-dihydroxy-2,5-diethoxydiphenyl ether, and the like materials.

A preferred form of the polyarylene polyethers of this invention are those prepared using the dihydric polynuclear phenols of the following four types, including the derivatives thereof which are substituted with inert substituent groups

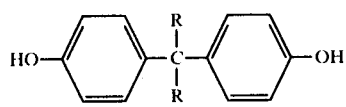

(a)

in which the R group represents hydrogen, lower alkyl, lower aryl and the halogen substituted groups thereof, which can be the same or different.

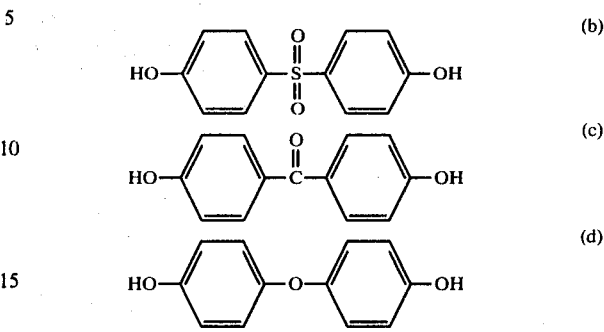

Thus, it is seen that the particular structure of the dihydric phenol moiety of the alkali metal salt reactant is not narrowly critical. However, as would be expected, this moiety or residuum in the polymer chain can alter or vary the properties of the resultant polymer produced. Similarly the reaction rate, optimum reaction temperature and like variables in the process can be varied by the selection of the particular dihydric phenol and the alkali metal salt thereof so as to give any desired change in rate, temperature, physical properties of the polymer and like changes.

It is also contemplated in this invention to use a mixture of two or more different dihydric phenols to accomplish the same ends as above. Thus when referred to above the —E— residuum in the polymer structure can actually be the same or different aromatic residua.

As herein used the F term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid compound or mixture of dihalobenzenoid compounds can be employed in this invention which compound or compounds has the two halogens bonded to benzene rings having an electron withdrawing group in at least one of the positions ortho and para to the halogen group. The dihalobenzenoid compound can be either mononuculear where the halogens are attached to the same benzoid ring or polynuclear where they are attached to different benzenoid rings, as long as there is an activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, as mentioned before, this water content should be maintained below below about 1% and preferably below 0.5% for best results.

Any electron withdrawing group can be employed as the activator group in these compounds. It should be, of course, inert to the reaction, but otherwise its structure is not critical. Preferred are the strong activating groups such as the sulfone group

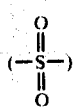

bonding two halogen substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49 273 (1951) and Quart. Rev., 12, 1 (1958). See also Taft, *Steric Effects in Organic Chemistry*, John Wiley & Sons (1956), chapter 13; *Chem. Rev.*, 53, 222; *JACS*, 74, 3120; and *JACS*, 75, 4231.

The electron withdrawing group of the dihalobenzenoid compound can function either through the resonance of the aromatic ring, as indicated by those groups having a high sigma* value, i.e., above about +0.7 or by induction as in perfluoro compounds and like electron sinks.

Preferably the activating group should have a high sigma* value, preferably above 1.0, although sufficient activity to promote the reaction is evidenced in those groups having a sigma* value above 0.7, although the reaction rate with such a low powered electron withdrawing group may be somewhat low.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent group which can activate displacement of halogens on two different rings, such as the sulfone group

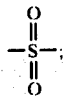

the carbonyl group

the vinylene group

the sulfoxide group

the azo-group —N=N—; the saturated fluorocarbon groups —CF$_2$CF$_2$—; organic phosphine oxides

where R is a hydrocarbon group, and the ethylidene group $$\begin{matrix} X-C-X \\ \| \\ -C- \end{matrix}$$

where X can be hydrogen or halogen or which can activate halogens on the same ring such as with difluorobenzoquinone, 1,4- or 1,5- or 1,8-difluoroanthraquinone.

Those skilled in the art will understand that a plurality of electron withdrawing groups may be employed if desired, including electron withdrawing groups having a sigma* value below about +0.7 provided the cumulative sigma* influence on each o the reactive halogen groups of the halobenzenoid compound is at least about 30 0.7.

If desired, the polymers may be made with mixtures of two or more dihalobenzenoid compounds each of which has this structure, and which may have different electron withdrawing groups. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

Essentially the reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers. Since the desirable properties of these polymers are secured because of the high molecular weights achieved, essentially equal molar amounts are preferred.

The reaction of the dihalobenzenoid compound with the alkali metal salt of the dihydric phenol readily proceeds without need of an added catalyst upon the application of heat to such a mixture in the selected sulfone or sulfoxide solvent. Inasmuch as the polymerization reaction is conducted in the liquid phase of the solvent, the selected reaction temperature should be below the ambient boiling point of solvent and above its freezing point. Such solvents as dimethyl sulfone and tetramethylene sulfone (sulfolane) freeze at about room temperatures. It is obvious that with such materials, elevated temperatures are desirable.

Also desirable is the exclusion of oxygen from the reaction mass to avoid any possibility of oxidative attack to the polymer or to the principal solvent during polymerization particularly at the higher temperatures.

Nitrogen blanketing the reaction flask serves this purpose very well.

While the reaction temperature is not narrowly critical, it has been found that at temperatures below about room temperature, the reaction time is inordinately long in order to secure high molecular weights. The higher temperatures i.e. above room temperature and generally above 100° C., are much more preferred for shorter processing times and for a more economical system. Most preferred are temperatures between about 120° C. to 160° C. Higher temperatures can of course be employed, if desired, provided that care is taken to prevent degradation or decomposition of the reactants, the polymer and the solvents employed. For example, dimethylsulfoxide is known to decompose at its boiling point, i.e. about 189° C. Consequently, it is desired to keep the reaction temperature below this to avoid such problems when employing this solvent.

Also temperatures higher than 100° C. are preferred in order to keep the polymer in solution during the reaction since these sulfoxide and sulfone solvents are not particularly good solvents for the polymer except in the hot condition. It is the feature of this system that high molecular weights are possible only when the growing polymer chain is dissolved in the solvent. Once the polymer precipitates from the solvent, its growing ceases, although it has also been found that when this happens, the addition of a second cosolvent as hereinbefore mentioned to the reaction or by increasing in reaction temperature, the precipitated polymer can be resolvated and the polymerization continued to higher molecular weights. Among such other cosolvents as might be mentioned for use solely to increase the fluidity of the reaction mass are diphenyl ether, anisole, xylene, chlorobenzene or dichlorobenzene and like materials even though other azeotrope formers may have previously been used or are still in the reaction mass.

The reaction temperature can be effectively increased even above the normal boiling point of the solvent or mixture of solvents by the use of pressure in the system. However, for most practical reactions contemplated herein, atmospheric pressures are quite adequate, though if desired pressures as high as 1000 psig or more can be employed.

Preferably the polymerization reaction mass is a true solution at the reaction temperature except for by-product inorganic salt which is generally insoluble in the reaction mass. However, the reaction can still proceed as a swollen gel of solvent and dissolved polymer if high solids reaction conditions are desired. This of course depends on the amount of solvent initially present and on the power of the agitator in the vessel. Desirably, it has been found that equal parts by weight of solvent and of total reactants seem to give optimum results. However if adequate stirring is provided and means are available for stripping the solvent from the polymer mass are provided, as little as one part solvent to five or more parts total reactants can still be desirable. Since these sulfone and sulfoxide solvents are quite expensive it is desired to use as little as possible, and preferably to use a cosolvent or inert diluent to provide sufficient fluidity to the reaction mass.

If however the polymer precipitates from the solvent at the reaction temperature, and such polymer is found to be of sufficiently high molecular weight for the intended end use, the reaction mass can be actually a mixture of the solvent having the reactants dissolved therein and the precipitated polymer. However as stated previously this technique does not make as high a molecular weight as when the polymer remains dissolved in the reaction medium.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Molecular weight of the polymer can be easily controlled in this process by the addition of a precipitating solvent to the reaction mixture when the desired reduced viscosity of the resin is secured or when the indicated viscosity of the polymerization mass is high enough to indicate the desired molecular weights are achieved. It is also possible to terminate the growing polymer chain by the addition of a monofunctional chain stopper, such as an alkyl halide or other suitable coreactant.

Since the polymerization reaction results in the formation of the alkali metal halide on each coupling reaction, it is preferred to either filter the salts from the polymer solution or to wash to polymer to substantially free it from these salts. For such reasons, the precipitation of the polymer from the reaction mass as a fluffy powder or fine granule is preferred, although chain termination is also beneficial in yielding a more stable polymer.

The polymers are characterized by high molecular weights that are not securable by any other known process or technique. The molecular weight of these polymers is indicated by reduced viscosity in indicated solvents. As well understood in the art, the viscosity of a resin solution bears a direct relationship to the weight average molecular size of the polymer chains, and is the most important single property that can be used to characterize the degree of polymerization. The reduced viscosity limitation assigned to the polymer masses of the present invention are therefore to be understood as significant in reflecting molecular size rather than consideration concerning the viscosity per se. It will further be obvious that reduced viscosity values used herein are of significance only relative to each other rather than in any absolute sense, and for this reason other polyether-solvent systems can be employed as an indication of the relative molecular weight of these polymers. When solvents other than chloroform are employed, the required average molecular size relationship can readily be established by reference to the reduced viscosity values defined herein even though the numerical reduced viscosity values of the alternative system may be different.

Most of these polymers have indicated ready solubility in chloroform, or tetrachloroethane or other similar solvent. In all instances, the reduced viscosity above about 0.35 is an indication of a tough, strong fiber- or film-forming polymer with those having a reduced viscosity above 0.4 being most preferred.

In a preferred manner of producing the polymer in accordance with this invention, bisphenol A, 2,2-bis(4-hydroxyphenyl)propane, is added to a mixture of dimethylsulfoxide and benzene (as an azeotroping agent) in about a 50:50 ratio, using about 2 to 4 parts total solvent per part by weight of bisphenol A. Two molar equivalents of potassium hydroxide is then added and the mixture refluxed for 3–4 hours (ca. 110°–130° C.) while continuously removing the benzene-water azeotrope or until the mixture contains less than about 0.5 percent by weight water and about 10 percent benzene.

An amount of difluorodiphenylsulfone equivalent to the molar amount of bisphenol A is then added and the resultant mixture maintained at 120°–160° C. for ½ to 2 hours, or until the solution becomes too viscous to stir. After the desired reduced viscosity is reached, preferably about 0.4, the polymer chains are terminated with methyl ether groups by the addition of a small amount of methyl chloride, and water added to precipitate the polymer. It is washed with methanol and/or water and dried.

Essentially quantitative yields of polymer having the structure

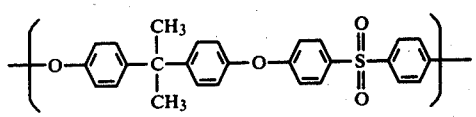

are secured (ca 98% yield or better). The product is practically free of by-products and is normally a colorless to slight amber, transparent resin. Typical physical properties are shown in the appended examples.

Comparative physical properties with other known high performance polymers are shown in the following Table I in which the polyhydroxyether is a bisphenol A polyhydroxyether of the formula

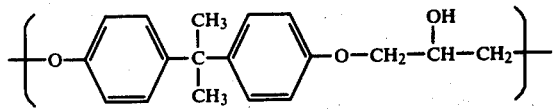

and the polycarbonate is a bisphenol A carbonate of the formula

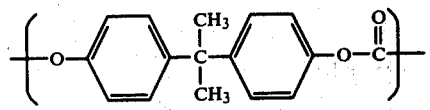

sold under the name Lexan by the General Electric Co.

Table I

|  | Polyarylene polyether | Polyhydroxyether | Polycarbonate |
| --- | --- | --- | --- |
| Tensile Modulus, psi | 300,000 | 280,000 | 300,000 |
| Tensile Strength, psi | 10,500 | 8,000 | 10,000 |
| Elongation to break % | 30–100 | 50–100 | 80–130 |
| Pendulum Impact, ft#/in³ | 100–200 | 100–150 | 400 |
| Tg °C. | 200° | 95–100 | 150 |
| TCU °C.* | 175 | 95 | 110 |
| Heat Distortion (264 psi) | 174 | 95 | 135 |

*TCU–continuous use temperature

As can be readily seen, this polymer is outstanding in its continuous use temperature range and in the high heat distortion temperature.

Among the other outstanding properties of these polymers are the retention of toughness down to very low temperatures as well as its good high temperature properties as well as heat aging characteristics as shown in Tables II, III and IV for the polymer as in Table I. In Table II, comparison physical properties at higher temperatures with the bisphenol A polycarbonate shows the polyarylene polyether to be significantly superior.

Table II

| Temp. °C. | Tensile Modulus, psi. | | Tensile Strength, psi. | |
| --- | --- | --- | --- | --- |
|  | Polyarylene Polyether | Polycarbonate | Polyarylene Polyether | Polycarbonate |
| +100 | 220,000 | 170,000 | 6,500 | 5,000 |
| +125 | 190,000 | 160,000 | 5,900 | 5,000 |
| +150 | 170,000 | 20,000 | 4,000 | 1,500 |
| +175 | 165,000 | softened | 3,000 | softened |
| +200 | 1,200 | — | 100 | — |

TABLE III

MECHANICAL PROPERTIES AS A FUNCTION OF TEMPERATURE FOR THE POLYARYLENE POLYETHER

| Temp. °C.ᵃ | Pendulum Impact ft#/in.³* | Tensile Modulus psi. | Tensile Strength psi. | Elongation to Break % |
| --- | --- | --- | --- | --- |
| −196 | 23 | — | — | — |
| −175 | 25 | 370,000 | 20,000 | 9 |
| −150 | 27 | 340,000 | 19,500 | 12 |
| −125 | 74 | 338,000 | 16,500 | 10–30 |
| −100 | 84 | 300,000 | 15,000 | 20–40 |
| −75 | 100 | 300,000 | 14,500 | 65 |
| −50 | 120 | 300,000 | 12,000 | 75 |
| −25 | 120 | 275,000 | 10,500 | 75 |
| −0 | 130 | 280,000 | 9,500 | 110 |
| +25 | 200 | 260,000 | 9,000 | 130 |
| +50 | — | 220,000 | 7,000 | 160 |
| +75 | — | 220,000 | 7,000 | 185 |
| +100 | — | 220,000 | 6,500 | 100 |
| +125 | — | 190,000 | 5,900 | 45 |
| +150 | — | 170,000 | 4,000 | 5 |
| +175 | — | 165,000 | 3,000 | 2 |
| +200 | — | 1,200 | 100 | 150 |

*At room temperature polystyrene = 5 ft. lbs./in.³ polypropylene = 50 ft. lbs./in.³

TABLE IV

ILLUSTRATION OF MELT STABILITY EXHIBITED BY THE POLYARYLENE POLYETHER

| Temp. 300° C. | | | | | |
| --- | --- | --- | --- | --- | --- |
| Time (min.) | 0 |  | 20 | 60 | 90 |
| Melt Flow (dg./min.) 200 psi | — |  | 1.9 | 1.8 | 1.8 |
| Red. Viscosity | 0.70 |  | 0.69 | 0.69 | 0.69 |
| Temp. 325° C. | | | | | |
| Time | 0 | 20 | 50 | 100 | 125 | 190 |
| Melt Flow dg./in. (44 psi) | — | 0.50 | 0.50 | 0.50 | 0.51 | 0.63 |
| Red. Viscosity | 0.70 | 0.69 | 0.70 | 0.70 | 0.69 | 0.68 |
| Temp. 350° | | | | | |
| Time | 0 | 30 | 70 | 120 | 180 |
| Melt Flow dg./min. (44 psi) | — | 1.5 | 1.6 | 1.7 | 2.3 |
| Red. Viscosity | 0.70 | 0.70 | 0.69 | 0.66 | 0.65 |

The electrical properties, i.e. dielectric constant, power factor, etc. are better than the bisphenol A polycarbonate resin and permeability to carbon dioxide, oxygen, hydrogen and nitrogen equivalent to the bisphenol A polycarbonate.

Creep resistance of the polymer is outstanding at 100° C. (loaded at 1% of tensile modulus) and appears to be far superior to any presently known polymers.

Contact of the polymer with boiling water, boiling 5% NaOH or boiling 5% sulfuric acid for 52 hours, 13 hours and 20 hours respectively shows no change whatsoever in any physical property. Only certain chlorinated solvents, i.e. chloroform, tetrachloroethane, methylene chloride, or cyclic ethers, i.e. tetrahydrofuran, dioxane, thiophene or higher polar solvents as nitrobenzene, p-chlorophenol, pyrrolidone, attack the polymer through dissolution. Ordinary aliphatic solvents, ketones, alcohols, nitriles or acetic acid have no effect on the polymer and do not dissolve it. The polymer is also free of strees crazing or environmental stress rupture even after 5 months in caustic, sulfuric acid, kerosene, oil, or synthetic detergents. Testing under 1500 psi tensile stress in an air oven at 150° C. showed the polymer to be basically unchanged after 900 hours.

Thus as is evident, these polymers are widely applicable to any desired end use in which such properties are desirable or necessary. Films and fibers made from these polymers are extremely tough and offer service over a wide range of use temperatures. Molded or extruded shapes of any sort can be made from these polymers by conventional techniques well known in the art. However, since these polymers have fairly high glass transition temperatures, forming temperatures are somewhat higher than those employed for polypropylene or polycarbonate resins.

In the appended Examples, the physical tests employed in measuring the properties of these were those as described in ASTM test method D-638-58T for tensile modulus, tensile strength, elongation to break, yield strength and yield elongation. Melt index was determined by ASTM test D-1238-57T.

Reduced viscosity (R.V.) as used herein was determined by dissolving a 0.2 gram sample of thermoplastic polyarylene polyether in the indicated solvent contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c \cdot t_o}$$

wherein:
$t_o$ is the efflux time of the pure solvent
$t_s$ is the efflux time of the polymer solution
c is the concentration of the polymer solution expressed in terms of grams of polymer per 100 ml. of solution.

Glass transition temperature ($T_g$), commonly referred to as second order phase transition temperatures, refers to the inflection temperatures found by plotting the resilience (recovery from 1 percent elongation) of a film ranging in thickness from 3-15 mils against the temperature. A detailed explanation for determining resilience and inflection temperature is to be found in an article by Alexander Brown "Textile Research Journal" volume 25, 1955, at page 891.

Pendulum impact was measured by ASTM test method D-256-56 modified as follows: A steel pendulum was used, cylindrical in shape with a diameter of 0.85 inch and weighing 1.562 pounds. The striking piece, mounted almost at the top of the pendulum was a cylinder 0.3 inch in diameter. Film specimens, 1-1.5 inches long, 0.125 inch wide and about 1 to 20 mils thick were clamped between the jaws of the tester so that the jaws were spaced 1 inch apart. The 0.125 inch width of the film was mounted vertically. The pendulum was raised to a constant height to deliver 1.13 foot pounds at the specimen. When the pendulum was released the cylindrical striking piece hit the specimen with its flat end, broke the film, and traveled to a measured height beyond. The difference in the recovery height (i.e., the difference in the potential energy of the pendulum at the maximum point of the upswing) represents the energy absorbed by the specimen during rupture. The impact strength, expressed in foot-pounds per cubic inch, is obtained by dividing the pendulum energy loss by the volume of the specimen. Five to ten specimens are tested for each material.

The following examples are illustrative of this invention. Unless otherwise indicated, all parts and percentages are by weight.

EXAMPLE 1 (PROCESS II)

In a 250 ml. flask equipped with a stirrer, thermometer, a water cooled condenser and a Dean Stark moisture trap filled with benzene, there were placed 11.42 grams of 2,2-bis(4-hydroxyphenyl)propane (0.05 moles), 13.1 grams of a 42.8% potassium hydroxide solution (0.1 moles KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130°-135° C., consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130°-140° with good stirring for 4-5 hours. The viscous, orange solution was poured into 300 ml. water, rapidly circulating in a Waring Blender, and the finely divided white polymer was filtered and then dried in a vacuum oven at 110° for 16 hours. The yield was 22.2 g (100%) and the reaction was 99% complete based on a titration for residual base. The reduced viscosity as measured in chloroform (0.2 gram polymer in 100 ml. at 25° C.) was 0.59.

The polymer had the basic structure

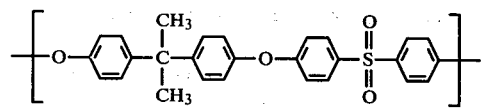

A substantial portion of the polymer was dissolved in 100 ml. tetrachloroethane and washed with dilute acetic acid and then water. After reprecipitation by pouring into 400 ml. of methanol, the polymer was filtered and dried in the vacuum oven at 70°. Films prepared by compression molding the powder at 270° C. and 2-3000 psi pressure gave the following properties:

Tensile Modulus: 293,000 psi
Tensile Strength: 10,200 psi
Elongation to break: 7%
Pendulum Impact: 50 ft-lbs/cu. in.

EXAMPLE 2 (Process II)

This example was conducted in the same manner as Example 1 except the total reaction time at 130°-140° was 10 hours. The product had a reduced viscosity of 0.65 (0.2 gram polymer in 100 ml. chloroform at 25° C.)

and compression molded film gave the following properties:
Tensile Modulus: 330,000 psi
Tensile Strength: 9,700 psi
Elongation to break: 2-19%
Pendulum Impact: 45 ft-lbs/cu.in.
Tg.: 190° C.

In order to determine the resistance of this polymer to various environments, small samples of the powdered polymer were exposed for the indicated times in the following liquids and in a hot air oven.

| Treatment | Time | Reduced Viscosity in Chloroform |
|---|---|---|
| None | — | 0.65 |
| Boiling Water | 51 hours | 0.65 |
| 5% Boiling NaOH | 12 hours | 0.65 |
| 5% Boiling H₂SO₄ | 20 hours | 0.65 |
| Air 259° C. | 5 hours | 0.64 |

The above shows that the polymer is highly stable at elevated temperatures to these indicated environments.

EXAMPLE 3 (Process II)

This example was conducted in the same manner as Example 1, except the molar concentration of reactants was higher in this case (0.75 moles for each reactant instead of 0.5 moles). The reduced viscosity of the polymer was 0.54 in chloroform. It also had a melt index at 44 psi and 282° of 0.43 dg./min.; and at 220 psi its melt index was 3.2 dg./min. Compression molded films gave the following results upon physical testing:
Tensile Modulus: 260,000 psi
Tensile Strength: 10,000 psi
Elongation to break: 10-15%
Pendulum Impact: 160 ft. lbs./cu. in.
Tg.: 195° C.

A high temperature exposure test run at 175° C. for 500 hours in an air circulating oven indicated no change in the Pendulum Impact for the compression molded sample after this time.

EXAMPLE 4 (PROCESS I)

This example was conducted in the same manner as Example 2 except the disodium salt of 2,2-bis(4-hydroxyphenyl)-propane was formed instead of the dipotassium salt by the use of 0.1 moles of NaOH. The reduced viscosity was 0.32 which indicates the sodium salt, therefore, to be slightly lower in reactivity than the potassium salt.

EXAMPLE 5 (PROCESS II)

To a 500 ml. stainless steel 4-necked resin flask equipped with a mechanical stirrer, condenser attached to a Dean-Stark trap, thermocouple, and nitrogen bubbler, was added 22.84 g. (100 m moles) of 2,2-bis(4-hydroxyphenyl)propane, 80 ml. benzene and 165 g dimethyl sulfone with stirring. The dropwise addition of 22.16 g potassium hydroxide solution (0.05 meg/g.) was started. After completion of the KOH addition the reaction mixture was heated to reflux to remove water and kept there for about 4.5 hours until substantially all of the water was azeotroped off.

After cooling to room temperature, 28.76 g 4,4'-dichlorodiphenyl sulfone was added and the reaction mixture was heated to 200° C. and held there for about 2 hours. The reaction mixture was cooled to 125° and the reaction terminated by reaction with methyl chloride for about 5 minutes.

The solid cake that resulted was broken up with the aid of a small amount of dimethylsulfoxide and coagulated in water in a large Waring Blender. The resulting polymer was dried in a vacuum oven after filtration.

The polymer was then heated at reflux with 500 ml. of chloroform for two hours and then pressure filtered with the aid of Celite filter aid. The solution was coagulated by adding to five times its volume of ethanol and after filtration, the polymer was dried in a vacuum oven at 120° C. for about 22 hours.

The polymer weighed 37.7 grams and had a reduced viscosity in chloroform of 0.65. It had the same structure as shown in Example 1.

EXAMPLE 6 (PROCESS I)

A slurry of 45.64 grams of the disodium hexahydrate salt of 2,2-bis(4-hydroxyphenyl)propane (0.12 mole) in 100 ml. toluene, contained in a reaction flask as described in Example 1, was refluxed with stirring for 2 hours during which time 13 ml. water was collected in the trap. About 35 ml. toluene was distilled off then 125 ml. sulfolane (tetramethylene sulfone) was added and toluene further distilled off until a total of 80 ml. had been removed and a pot temperature of 210° was reached. This resulted in a smooth slurry of finely divided white disodium salt of bisphenol A in substantially anhydrous sulfolane.

The mixture was cooled and 34.46 grams bis(4-chlorophenyl)sulfone (0.12 mole) added. The mixture was then heated 1½ hours at about 220°-225°. The viscous polymer solution was cooled to 190°-200° and treated with methyl chloride then cooled further and diluted with 125 ml. chlorobenzene. The diluted reaction mixture was filtered to remove salt and precipitated in alcohol in a Waring Blender. The polymer was dried in a vacuum oven overnight at 150°. The yield was 46 g. and the reduced viscosity in chloroform was 0.53. The polymer had the same structure as in Examples 1 and 5.

EXAMPLE 7 (PROCESS II)

This example was conducted in the same manner as Example 1 except 1,1-bis-(4-hydroxyphenyl)-1-phenylethane (bisphenol of acetophenone) is used as the dihydric phenol. The reaction time was 10 hours at 130°-140° C. and the reduced viscosity in chloroform was 0.54. At the conclusion of the reaction, a solution of 0.5 g methyl chloride in 6 ml. dimethylsulfoxide was added at 90°-100° to convert unreacted aryloxide endgroups to the more stable aryl methyl ether end-groups. It had the structure:

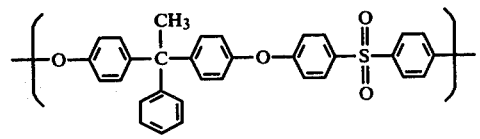

Clear, tough films were made by compression molding the powdered polymer at 280° C. at 2-3000 psi room temperature. The mechanical properties are:
Tensile Modulus: 325,000 psi
Tensile Strength: 11,000 psi
Elongation to Break: 6-20%
Pendulum Impact: 50 ft-lbs/cu.in.
Tg.: 200° C.

EXAMPLE 8 (PROCESS II)

Into a 250 ml. flask equipped with stirrer, thermometer, addition funnel and reflux condenser were added 11.72 g. (0.0514 moles) of 2,2-bis(4-hydroxyphenyl)propane, 14.72 g. (0.0512 moles) of 4,4'-dichlorodiphenylsulfone and 50 ml. of dimethylsulfoxide under nitrogen pressure. The mixture was heated to 90° and 48.8 ml. of a solution of potassium t-butoxide in dimethylsulfoxide (2.13 molar) solution constituting 0.104 moles of potassium t-butoxide, was slowly added over ca. 4 hours with most of the base being added in the first hour. The solution was heated to 130° and held at 120°-130° for 4 hours. After recovering and washing the polymer as in Example 1, the yield of polymer was 100% and had a reduced viscosity of 0.44 in chloroform, and a structure as follows:

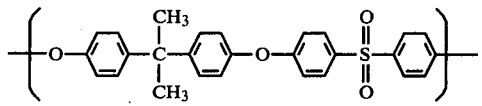

Compression molded films gave the following results on physical testing:
Tensile Modulus: 390,000 psi
Tensile Strength: 11,300 psi
Elongation to break: 5%
Pendulum Impact: 45-90 ft-lbs/cu. in.
Tg.: 190°-200° C.

EXAMPLE 9 (PROCESS II)

This example was conducted in the same manner as Example 1 except that the dihydric phenol employed was 4,4'-dihydroxydiphenylmethane and the reaction temperature and time were 130°-135° C. and 7 hours respectively. The reduced viscosity of the polymer (measured as a 0.2 gram sample in chloroform was 0.65. It had the structure:

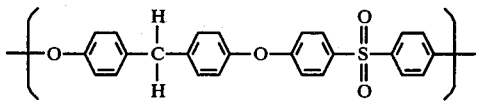

Tough, transparent films were cast from chloroform solution prepared by dissolving 8 grams of polymer in 65 ml. chloroform and casting the viscous solution onto a glass plate with a 19 mil doctor blade. The prepared films were air dried and then placed in an oven overnight at 140° C. The clear films were readily lifted off the glass plate and were found to be one mil thick. The following physical properties were obtained on this film.
Tg.: 180° C.
Tensile Modulus: 270,000 psi
Tensile Strength: 8,400 psi
Elongation to Break: 85%
Pendulum Impact: 80 ft-lbs/cu. in.

EXAMPLE 10 (PROCESS II)

This example was conducted in the same manner as Example 1 except hydroquinone was used as the dihydric phenol and reaction conducted at 130°-140° C. for 6 hours. The reduced viscosity was 0.45 (p-chlorophenol at 25° C.). The resin melted at about 310° C. and tough films were prepared by melt pressing the polymer at 300°-320° C. The polymer had the basic structure:

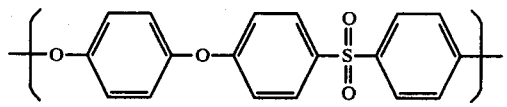

EXAMPLE 11 (PROCESS II)

This example was conducted in the same manner as Example 1 except that 1,3-bis(p-hydroxyphenyl)-1-ethylcyclohexane (the bisphenol prepared by acid catalyzed condensation of 2 moles of phenol with one mole vinylcyclohexene) was used as the dihydric phenol. The reaction was conducted for 7 hours at 130°-140° after which the polymer was precipitated, washed and dried as in Example 1. Clear, tough films were made by compression molding at 330° C. and 2-3000 psi, and by casting from chloroform. The polymer had a reduced viscosity of 0.74 in chloroform and had a basic structure.

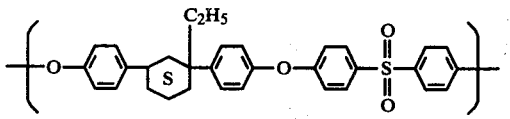

Some mechanical properties are:
Tensile Modulus: 310,000 psi
Tensile Strength: 9,100 psi
Elongation to Break: 100-125%
Pendulum Impact: 100 ft-lbs/cu. in.
Tg.: 230° C.

Example 12 (Process II)

This example was conducted in the same manner as in Example 1 except that the dihydric phenol was 1,1-bis(4-hydroxyphenyl)-2,2-dimethylethane. (Bisphenol of isobutyraldehyde). The reaction was conducted for 7 hours at 130°-135° after which the polymer was recovered, washed and dried. The polymer had a reduced viscosity of 0.49 in chloroform and had the basic structure:

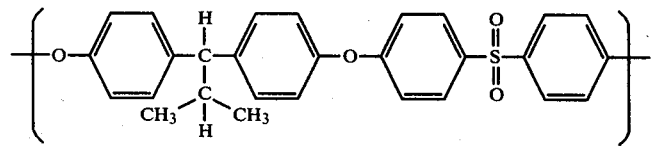

Clear, tough films were prepared by compression molding at 260° and 2-3000 psi. Mechanical properties of the film samples are as follows:
Tensile Modulus: 275,000 psi
Tensile Strength: 9,400 psi
Elongation to Break: 6-15%

Pendulum Impact: 68 ft. lbs/cu.in.
Tg.: 200°–205° C.

EXAMPLE 13 (PROCESS II)

This example was conducted in the same manner as Example 1 except 4,4'-difluorodiphenylsulfone is used instead of the dichlorodiphenylsulfone. After only 40 minutes at 40°–147°, the reduced viscosity of the polymer in chloroform was 0.95. By comparison with Example 1 it is readily evident that the use of the difluoro compound gives a much faster reaction. The polymer was of the same structure shown in Example 1 but of much higher molecular weight.

EXAMPLE 14 (PROCESS II)

This example was conducted in the same manner as Example 13 except the dihydric phenol is 4,4'-dihydroxydiphenylsulfone. After 5½ hours reaction at 130°–140° and 4 more hours at 160° the reduced viscosity was 0.38 as measured in tetrachloroethane. The polymer has the structure as shown.

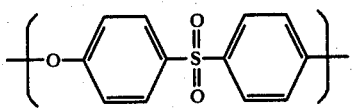

The thermal and mechanical properties of this polymer are outstanding. Tough films made by compression molding at 330° C. and 2–3000 psi have the following properties:
Tensile Modulus: 275,000 psi
Tensile Strength: 10,000 psi
Elongation to Break: 7%
Pendulum Impact: 86 ft-lbs./cu. in.
Tg.: 245° C.

At 325° C. the molten polymer did not discolor, evolve gas or undergo any other visual change after 25 minutes in air. The Melt Flow was 4 after 13 minutes and 6 after 25 minutes at 325° C. Substantially the same results were found at 350° C.

Film samples of this polymer were heat aged at 200° C. and 225° C. in air with the following changes in the Pendulum Impact values:

|  | P.I. (ft-lbs/cu. in.) | |
| --- | --- | --- |
|  | 200° | 225° |
| as made |  | 86 |
| 72 hours aging | 81 | 68 |
| 144 hours aging | 68 | 73 |
| 288 hours aging | 65 | 72 |

-continued

|  | P.I. (ft-lbs/cu. in.) | |
| --- | --- | --- |
|  | 200° | 225° |
| 500 hours aging | 30 | 50 |

EXAMPLE 15 (PROCESS II)

This example was conducted in the same manner as in Example 14 except the following reaction heating schedule was employed:
110°–130° for 0.5 hour
130°–140° for 3.75 hours
140°–150° for 3.2 hours
and 150°–170° for 0.75 hour The mixture was then cooled to 150° and 75 ml. or ortho-dichlorobenzene was added and the mixture heated to 170° and held at 170°–175° for 2½ hours. The reaction mixture was poured into excess methanol to coagulate the polymer after which it was washed with hot methanol, then hot water, and finally dried to constant weight at 150° in a vacuum oven. The reduced viscosity of the polymer was 0.65 measured in tetrachloroethane. It also has the structure:

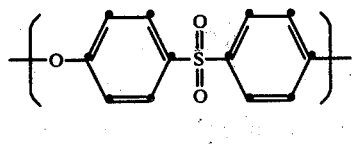

as in Example 14.

EXAMPLE 16 (PROCESS II)

This example was conducted in the same manner as Example 13 except that the dihydric phenol was 4,4'-dihydroxybenzophenone. After 4½ hours reaction at 135°–145°, the polymer was recovered, and had a reduced viscosity of 0.39 in chloroform. Compression molded films prepared at 290° C. and 2–3000 psi were extremely tough and had the structure:

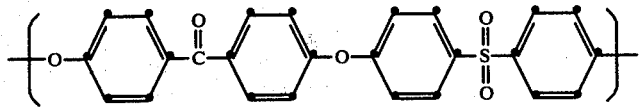

and the following physical properties:
Tensile Modulus: 290,000 psi
Tensile Strength: 10,700 psi
Elongation to Break: 5–60%
Pendulum Impact: 107 ft-lbs/cu. in.
Tg.: 205° C.

EXAMPLE 17 (PROCESS II)

This example was conducted in the same manner as in Example 13 except the bisphenol of acetophenone was used. After 90 minutes reaction at 114°–147°, the polymer was recovered and had the structure:

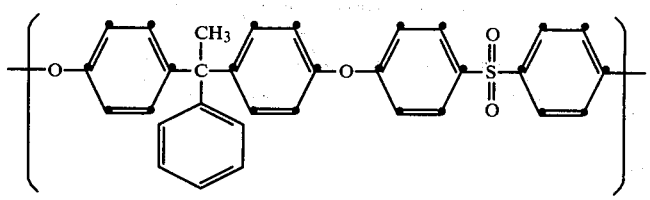

and a reduced viscosity in chloroform of 0.63.

EXAMPLE 18 (PROCESS II)

This example was conducted in the same manner as Example 13 except the dihydric phenol was 4,4'-(dihydroxyphenyl) diphenylmethane (bisphenol of benzophenone). After 20 minutes reaction at 110°–127° the polymer was recovered and had the structure:

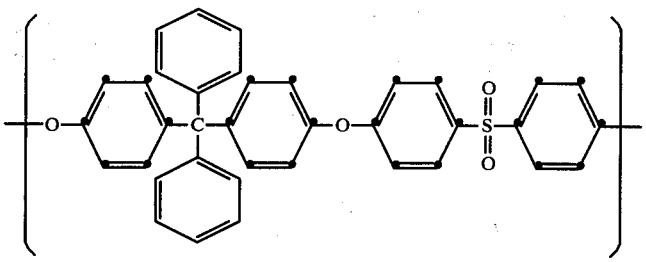

and a reduced viscosity in chloroform of 0.70. Films pressed at 330° C. and 2–3000 psi were clear and had the following properties:
  Tensile Modulus: 350,000 psi
  Tensile Strength: 8,800 psi
  Elongation to Break: 3–7%
  Pendulum Impact: 4–14 ft-lbs/cu. in.
  Tg.: 230° C.

EXAMPLE 19 (PROCESS II)

To a 500 ml. 3-necked flask equipped with a mechanical stirrer, condenser attached to a Dean-Stark trap, thermocouple well fitted with two thermocouples, and an Argon bubbler, was added 22.84 g. (100 m moles) of toluene recrystallized, 2,2-bis(4-hydroxyphenyl)propane, 80 ml. benzene and 150 ml. distilled dimethylsulfoxide. With stirring, the dropwise addition of 21.49 g. potassium hydroxide solution (9.31 meq. KOH/gm.) was started. After completion of the KOH addition, the reaction mixture was heated to reflux and maintained there for about 5.5 hours, while continuously removing the benzene-water azeotrope to secure an anhydrous solution of the dipotassium salt of 2,2-bis(4-hydroxyphenyl)propane in the dimethylsulfoxide.

After cooling to room temperature, 21.84 g. (100 m moles) of 4,4'-difluorobenzophenone was added. Heat was applied and soon the viscosity of the reaction mixture was observed to increase. About 30 min. after addition of the difluorobenzophenone the polymer appeared to be out of solution and 40 ml. o-dichlorobenzene was added. The reaction had been heated from 25° to 135° during the thirty minute period. Eight minutes after the o-dichlorobenzene was added, methyl chloride addition was started in order to convert the terminal end groups to the more stable methoxy end groups. The gas was passed through the reaction mixture for five minutes and the reaction mixture was then allowed to cool to room temperature. The polymer separated from solution upon cooling.

About 250 ml. chloroform was added to the reaction mixture which tended to plasticize the polymer. The whole reaction mixture was then added to 21.7 grams ethanol in a large Waring Blender filtered, and washed again in the blender with ethanol. After drying several hours in a vacuum oven at 105°, the powder was washed twice with 2 liters distilled water in the Waring Blender. The white powder was then dried several days in a vacuum oven at 100° C. The product weighed 36.2 g. and had a reduced viscosity of 1.0 (0.05 g./25 ml. tetrahydrofuran at 25° C.) Films were prepared as in Example 1. It had the structure:

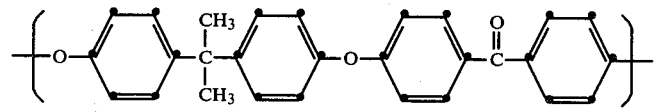

Properties obtained on compression molded films were as follows:
  Tensile Modulus: 270,000 psi
  Tensile Strength: 9,600 psi
  Elongation to Break: 150%
  Pendulum Impact: 200–300 ft-lbs/cu. in.
  Tg.: 155° C.

EXAMPLE 20 (PROCESS II)

The preparation of the dipotassium salt of the bisphenol and azeotroping step was carried out in the same manner as Example 19 except that 32.44 g. of α-pinene bisphenol, prepared by the acid catalyzed condensation of phenol and α-pinene, was substituted for the 2,2-bis(4-hydroxyphenyl)-propane. The reflux was maintained for 4.75 hours to remove all the water.

This bisphenol is composed of a mixture of two specific position isomers, generally in a 2 to 1 molar ratio of β bisphenol

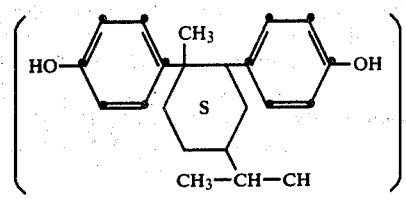

and α bisphenol

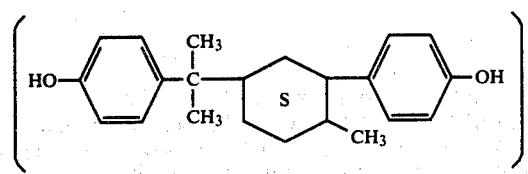

prepared by condensing 2 moles of phenol with one mole of α-pinene in the presence of an acidic cation exchanging resin. Use of weaker acidic catalysts such as aluminum chloride can form the α bisphenol

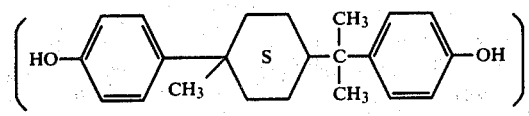

isomer from phenol and dipentene hydrochloride, if such is desired.

After adding the difluorobenzophenone, the reaction mixture was heated at about 130°–140° for about 3 hours. Forty ml. of o-dichlorobenzene was added when the reaction temperature reached 130°. Chain termination was again accomplished with methyl chloride for 5 minutes. Isolation in the manner of Example 19 except that the reaction was not diluted with chloroform, gave 46.5 g. polymer as a white powder, with a reduced viscosity of 0.87 (0.05 g./25 ml. chloroform at 25° C.)

The polymer had the basic structure for the β bisphenol portion

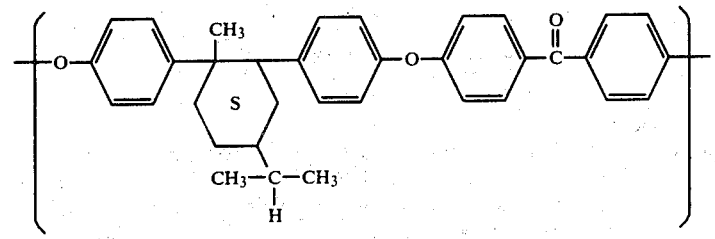

Properties obtained on a compression molded film were as follows:
Tensile Modulus: 245,000 psi
Tensile Strength: 9,500 psi
Elongation to Break: 18–135%
Pendulum Impact: 200–300 ft-lbs/cu. in.
Tg.: 200° C.

EXAMPLE 21 (PROCESS II)

In a 500 ml. flask equipped as in Example 19 were placed 25.03 g. (0.10 moles) of 4,4'-dihydroxydiphenylsulfone), 100 ml. xylene and 21.47 g. of KOH solution, (9.31 meq. KOH per g.). The precipitate formed but dissolved when 150 ml. of tetrahydrothiophene-1, 1-dioxide (commonly called sulfolane or tetramethylene sulfone, which had been vacuum distilled from NaOH) was added. The reaction mixture was heated to reflux and water removed through the Dean-Stark trap. Reflux was maintained for about 4 hours to remove all the water and form the dipotassium salt of the 4,4'-dihydroxydiphenylsulfone in an anhydrous solution of the sulfolane and xylene.

After cooling to 45° C., 28.76 g. (100 m moles) of 4,4'-dichlorodiphenylsulfone was added and the reaction mixture, containing a precipitate, was heated to 240° C. Most of the xylene distilled off at 154°–166°. At 215° the reaction mixture nearly cleared. The yellowish reaction mixture was held at 240° C. for about 3.75 hours. It was then cooled to 160° and terminated for 5 minutes with methyl chloride.

After cooling to 50° C., the reaction mixture was coagulated in 2 liters ethanol in a large Waring Blender. The washing was repeated after filtration and then the powdery product was dried one hour at 100° in a vacuum oven. It was then washed in the large Waring Blender two times with 21 liters of distilled water, filtered and dried overnight at 100° in a vacuum oven. In this manner 43.6 g. of white powdery polymer was obtained with a reduced viscosity of 0.48 (0.05 g./25 ml. of 1,1,2,2-tetrachloroethane at 25° C.).

The polymer had the basic structure

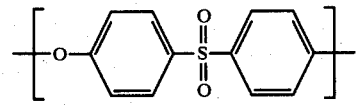

EXAMPLE 22 (PROCESS II)

To a solution of 24.26 g. 4,4'-dihydroxy diphenyl ether (0.12 mole) in 160 cc. dimethyl sulfoxide and 45 cc. benzene in a 500 cc. reaction flask was added under a nitrogen atmosphere 25.27 g. 53.28% KOH (0.24 mole). The mixture was refluxed with stirring and slow nitrogen sparge with removal of water by a Dean-Stark trap for a total of 5 hrs. The mixture of solid potassium salt of 4,4'-dihydroxydiphenyl ether and solvent was cooled to room temperature and 34.46 g. 4,4'-dichlorodiphenylsulfone (0.12 mole) added. The reaction mixture was then warmed to about 130° for 3.5 hrs. during which time it became quite viscous. The mixture was cooled to 110°–120° and methyl chloride bubbled in for a short time to methylate any unreacted phenoxide groups.

The reaction mixture was cooled, dissolved in 200 cc. methylene chloride, washed with several portions of water and the polymer solution precipitated into alcohol in a Waring Blender. After washing with alcohol and drying in a vacuum oven at 100° overnight the yield of polymer was 48 g. (calc. 49.9). This polymer had a reduced viscosity of 0.53 (0.05 g/25 ml. chloroform at 25°). It had the basic structure

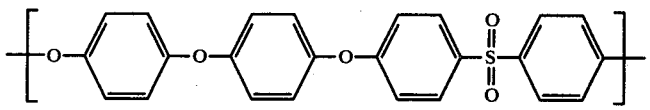

A film was compression molded at 260° at 2–3000 psi. and exhibited the following properties.
Tensile Modulus: 270,000 psi
Tensile Strength: 10,000 psi
Elongation to Break: 75–200%
Pendulum Impact: 200–500 ft-lbs/cu. in.
Tg.: 180° C.

EXAMPLE 23 (PROCESS II)

To a solution of 27.4 g. 2,2-bis(4-hydroxyphenyl)-propane (0.12 mole), 160 cc. dimethylsulfoxide and 45 cc. benzene there was added 25.27 grams of a 53.28% aqueous KOH solution (0.24 mole). The mixture was refluxed as in the previous example for 5 hrs. for water removal and securing the anhydrous dipotassium salt of the 2,2-bis(4-hydroxyphenyl)propane dissolved in the dimethylsulfoxide.

The mixture was cooled and 23.04 g. 2,4-dichloronitrobenzene (0.12 mole) added. Some darkening and a rapid temperature rise to 70° were noted. After about 10 min. at this temperature, the viscosity was noticeably increased. The mixture was held 3½ hrs. at about 80° then methyl chloride bubbled in for a short time. The reaction mixture was diluted with 40 cc. benzene and filtered through a Seitz filter to remove salt. The clear polymer solution was precipitated into alcohol in a Waring Blender, filtered, washed with alcohol and dried in a vacuum oven. Yield 36 g. (calc. 41.6).

The polymer had the basic structure

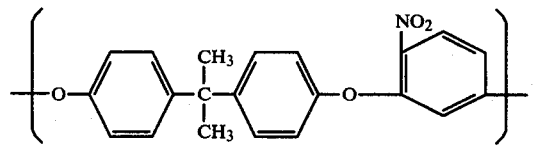

and a reduced viscosity of 0.49 (0.05 g./25 ml. CHCl₃ at 25°). A film molded at 190° was yellow and showed the following properties:
Tensile Modulus: 320,000 psi
Tensile Strength: 10,500 psi
Elongation to Break: 5–50%
Pendulum Impact: 5 ft-lbs/cu. in.
Tg.: 150° C.

EXAMPLE 24 (PROCESS II)

Into a 35 gallon standard autoclave equipped with an anchor agitator operating at 70 rpm, and containing 120 pounds of dimethylsulfoxide and 30 pounds of benzene, there was added 20 pounds of 2,2-bis(4-hydroxyphenyl)propane (0.0877 # moles) and 19.6 pounds of a 50% aqueous KOH solution (0.175 # moles KOH). Heat was supplied to the reactor and the mixture began boiling at 95° C. Heating was continued for 24 hours until the temperature rose to about 110° C. while continuously removing the benzene-water azeotrope. About 25.1 pounds of a mixture of water, benzene and dimethylsulfoxide was removed during this period. Heating was further continued to 125° C. to distill off additional benzene and assure substantial anhydrousness of the mixture, and complete neutralization of the 2,2-bis(4-hydroxyphenyl)propane to the dipotassium salt.

The mixture was cooled to 70° C. and 25.1 pounds of dichlorodiphenylsulfone (0.0877 # moles) was added and the reaction mass reheated to 140° C. and kept between 135°–140° C. for seven hours and forty-five minutes. Polymerization was terminated by adding 1.1 lbs. of methyl chloride after which the reaction mass was cooled and then 120 pounds of methylene chloride was added.

The contents of the reactor were dumped into a large drum containing 190 pounds of methylene chloride and the precipitated potassium chloride was permitted to settle out. The supernatent liquid consisting primarily of dimethylsulfoxide, methylene chloride and dissolved polymer was drained off and washed seven times with forty gallons of water each time. The first three washes contained 1.3 pounds of oxalic acid and the last four washes contained 0.3 pounds of acetic acid. These washes neutralized any residual caustic and removed the salts and residual dimethylsulfoxide.

The remaining methylene chloride-polymer mixture was filtered and then added to three times its volume of ethanol to precipitate the polymer. The polymer was recovered by filtration and reslurried once in ethanol recovered again and vacuum dried in an oven.

The fluffy white polymer had a reduced viscosity in chloroform of 0.49, and a melt flow of 3.0 dg./min. (measured at 310° C. and 44 psi.). It had the basic structure.

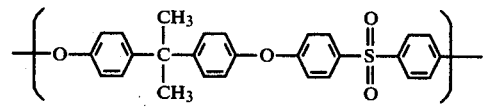

Film was prepared from this polymer by extrusion through a 1⅜ inch diameter electrically-heated tubing die on a conventional 1.5 inch screw driven extruder. The extruder was run at 275°–290° C. in the back zone and 290°–310° C. on the front zone. The die and crosshead were held at 270°–290° C. Using a normal compression-type screw (polyethylene type) it was found desirable to "starve feed" the extruder. This prevented overloading the extruder drive and stalling the equipment. Screw speed was 28 r.p.m. The 1⅜" diameter extrudate (40 mil thick) was blown directly at the die face to a cylinder 8" to 9" in diameter. It was drawn down in the machine direction as well as transversely to a final gage of ½ to 3 mils, depending upon the particular draw down speed used. About 15 pounds of polymer were extruded into the various thicknesses of film.

The film exhibited very little molecular orientation since the film was blown at such a high (270° C.) temperature above the 190° C. second order temperature. The tubular film was collapsed using the "ironing section" of the tubular film apparatus to give wrinkle-free film when the maximum heat was used in this section. The high second order temperature required additional heater capacity on the unit to insure adequate ironing out of the collapsing wrinkles.

The properties of the 1.5 mil film prepared as above described are as follows:

|  | M.D. | T.D. |
| --- | --- | --- |
| Tensile Modulus, psi. | 290,000 | 266,000 |
| Tensile Strength psi. | 9,600 | 7,800 |
| Yield Strength, psi. | 9,000 | 7,650 |
| Yield Elongation, % | 5.0 | 4.5 |
| Ultimate Elongation, % | 167 | 25–125 |

The film was clear, transparent, glossy and tough. It has high uninitiated and initiated tear strength.

EXAMPLE 25 (PROCESS II)

This example was conducted in essentially the same manner as Example 1, employing as one reactant, the dipotassium salt of hexafluorobisphenol A having the structure

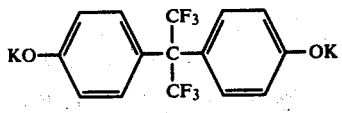

which was made by reacting 33.63 grams of the hexafluorobisphenol A (0.1 moles) with 21.06 grams (0.2 moles of a 53.2% aqueous potassium hydroxide solution, in 150 ml. dimethylsulfoxide and 45 ml. benzene. After refluxing for 4.5 hours to azeotropically remove the water, the dipotassium salt of the hexafluorobisphenol A was reacted with 25.42 gms. of 4,4' difluorodiphenylsulfone (0.1 moles to obtain the polyether having the structure

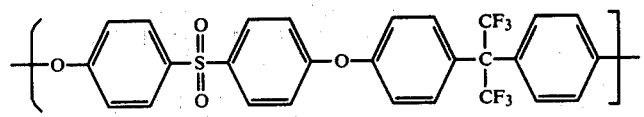

The reaction was conducted at 120°–30° C. for one hour after which the polymer was recovered, washed and dried as in Example 1. 54.3 Grams of a white granular powder was secured. The reduced viscosity of the polymer in chloroform was 0.60 and the following mechanical properties of compression molded film samples were measured.

Tg.: 205° C.
Tensile Modulus: 280,000 psi
Tensile Strength: 9,500 psi
Elongation: 3–36%
Pendulum Impact: 60 ft-lbs./cu. in.

The polymer was highly resistant to oxidation in that it did not discolor or change in physical properties after one month in a 225° C. air oven. It also showed substantially no change after 2 hours at 350° C. in a nitrogen atmosphere but did gel at 400° C. in about 2 to 3 hours.

EXAMPLE 26 (PROCESS II)

This example was run in a manner substantially the same as Example 25, except that 4,4'-difluorobenzophenone was substituted for the 4,4'-difluorodiphenylsulfone. The polymer had the structure

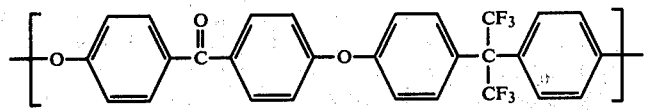

and a reduced viscosity in chloroform of 0.68. It had the following mechanical properties, as measured on a compression molded film sample.

Tg: 175° C.
Tensile Modulus: 285,000 psi
Tensile Strength: 10,500 psi
Elongation: 170%
Pendulum Impact: 200 ft-lbs/cu. in.

It had equivalent oxidation and high temperature resistance to the polyether of Example 25.

EXAMPLE 27 (Process IIA)

Into an air-free 500 ml flask equipped with a stirrer, gas inlet tube, thermocouple, distillation trap and reflux condenser was placed 65 grams of dimethylsulfoxide and 200 grams of chlorobenzene azeotrope former. The ratio of dimethylsulfoxide to chlorobenzene was 1:3.1. 30.0 Grams (0.1314 mole) of bisphenol A and 37.7 grams (0.1314 mole) of 4,4'-dichlorodiphenylsulfone were then simultaneously charged into the reaction flask which was immediately sparged with nitrogen to exclude any possibility of air contamination. Thereafter, the clear, nearly colorless solution was heated to about 75° C. and 21.5 grams (0.2628 mole) of 49% aqueous sodium hydroxide were added from a dropping funnel. Two liquid phases formed immediately. The reaction mass was then heated to 120° C. at which point a water-chlorobenzene azeotrope began distilling from the system. Distillation of the azeotrope was continued for about 30 minutes with a gradual rise in temperature to 140° C. at which point essentially all of the water in the system was removed. The disodium salt of bisphenol A precipitated and one liquid phase was present. Excess chlorobenzene was then removed by increasing the temperature gradually to about 170° C. and distilling off excess azeotrope former for about 20 minutes. At this point the ratio of dimethylsulfoxide to chlorobenzene was 4:1. As soon as this ratio was reached, considerable polymerization occur because of the high reaction temperature. The temperture of the reaction mass was rapidly dropped to about 150°–160° C. and held there with stirring for about one hour. Gaseous methyl chloride was introduced until no more was adsorbed. The mixture was diluted to 10–15% solids by adding chlorobenzene. The polymer was isolated by coagulation in 4 5 formula volumes of ethanol after filtering to remove by-product sodium chloride. The finely divided white polymer was then dried in a vacuum oven at 110° C. for 16 hours. The yield was 52 grams (90%) and the reaction was 100% complete based on a titration for residual base. The isolated polymer had a reduced viscosity in chloroform of 0.90, a very light amber color and was composed of recurring units having the formula hydroxyphenyl)-1-phenylethane (bisphenol of acetophenone) was used. The isolated polymer had a reduced viscosity in chloroform of 0.56, a very light amber color, and was composed of recurring units having the formula

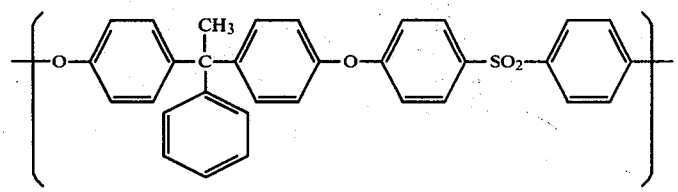

The total preparation time for this example exclusive of polymer recovery and drying was 2 hours.

EXAMPLE 31 (PROCESS IIA)

Example 27 was duplicated except that in place of 4,4'-dichlorodiphenylsulfone, 32.0 g (0.1314 mole) of 4,4'-dichloroazobenzene was used. The isolated polymer had a reduced viscosity in p-chlorophenol of 0.17,

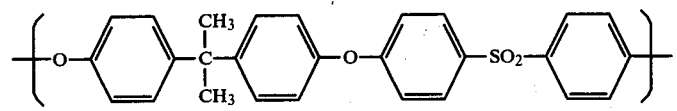

The total preparation time exclusive of polymer recovery and drying in this example was 1 hour, 50 minutes.

a bright orange color owing to the presence of the azo linkages and was composed of recurring units having the formula

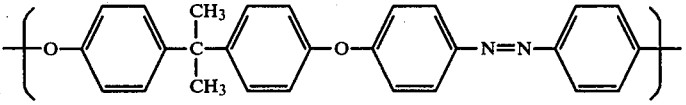

EXAMPLE 28 (PROCESS IA)

Example 27 is duplicated, but instead of converting bisphenol A in situ to the disodium salt, the disodium hexahydrate salt of bisphenol A is employed. Reaction time and polymer properties are comparable to those of Example 27.

EXAMPLE 29 (PROCESS IIA)

Example 27 was duplicated except that in place of bisphenol A, 39.1 grams (0.1314 mole) of 1,3-bis-(p-hydroxyphenyl)-1-ethylcyclohexane (the bisphenol prepared by an acid catalyzed condensation of 2 moles of phenol with one mole vinylcyclohexene) was used. The isolated polymer had a reduced viscosity in chloroform of 0.66, a very light amber color, and was composed of recurring units having the formula The total preparation time for this example exclusive of polymer recovery and drying was 7 hours.

EXAMPLE 32 (PROCESS IIA)

Example 27 was duplicated except that in place of 4,4'-dichlorodiphenylsulfone, 29.6 g (0.1314 mole) of 4,4'-difluoroazobenzene was used. Owing to the high reactivity of this monomer, polymerization was virtually complete at the conclusion of chlorobenzene removal. Upon cooling, the polymer separated from the viscous mass. It was estimated that the reduced viscosity was about 1, as measured in o-dichlorobenzene at 25° C., at this point. To reach this viscosity only an 18 minute reaction was required. Additional heating at 140°–170° C. over a 6½ hour period raised the reduced viscosity to 1.47. During this period most of the poly-

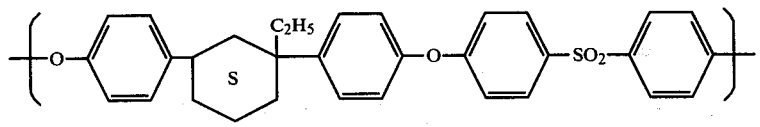

The total preparation time for this example, exclusive of polymer recovery and drying was two hours.

EXAMPLE 30 (PROCESS IIA)

Example 27 was duplicated except that in place of bisphenol A, 38.2 grams (0.1314 mole) of 1,1-bis-(4- mer appeared to be insoluble. The bright red polymer which was isolated was of the same structure as the product in Example 30. The total preparation time for this example exclusive of polymer recovery and drying was 8 hours.

EXAMPLE 33 (PROCESS IIA)

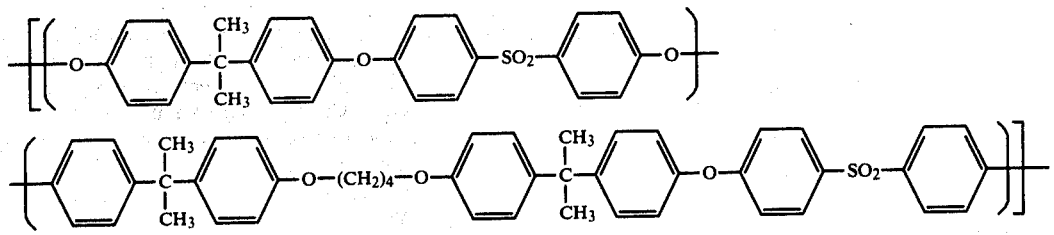

Example 32 was duplicated only 24.8 g of the 4,4'-difluoroazobenzene was added initially so that a less viscous, more readily handleable mixture would result after the chlorobenzene removal step. Thereupon the mass was cooled to 115° C. and the balance (of theory) of the fluoromonomer (4.89) was added. Polymerization was continued over 14 minutes at 115°–130° C. followed by a 30 minute period at 90°–120° C. during which a total of 160 ml. of o-dichlorobenzene was gradually added in order to keep the polymer in solution. The isolated polymer had an RV of 1.56 as measured in o-dichlorobenzene at 25° C. The total preparation time for this example exclusive of polymer recovery and drying was 2 hours.

EXAMPLE 34 (PROCESS IIA)

Example 27 was duplicated except that in place of bisphenol A, 25.5 g (0.05 mole) of tetramethylene dibisphenol A (the bisphenol prepared by condensation of 2 moles of phenol with 1,4-bis(p-isopropenyl phenyl) butane and the corresponding molecular quantities of the 4,4'-dichlorodiphenyl sulfone (14.4 g, 0.05 mole) and caustic (8.1 g of 12.46 me/g., 0.10 mole) were used. The isolated polymer had a reduced viscosity as measured in chloroform of 0.80 and was composed of recurring units having the formula

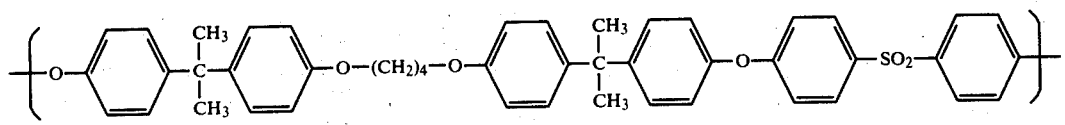

The total preparation time for this example, exclusive of polymer recovery and drying was 2 hours.

EXAMPLE 35 (PROCESS IIA)

Example 27 was duplicated except that 22.5 g (0.0985 mole) of bisphenol A were used in addition to 16.8 g (0.0329 mole) of tetramethylene bisphenol A. The isolated polymer had a reduced viscosity of 0.85 as measured in chloroform and was composed of recurring units having the formula The total preparation time for this example exclusive of polymer recovery and drying was 2 hours.

EXAMPLE 36 (PROCESS IIA)

Example 27 was duplicated except that 22.5 g (0.0985 mole) of bisphenol A were used in addition to 6.7 g (0.033 mole) of 4,4'-dihydroxydiphenyl ether. The isolated polymer had a reduced viscosity of 0.84 as measured in chloroform and was composed of recurring units having the formula

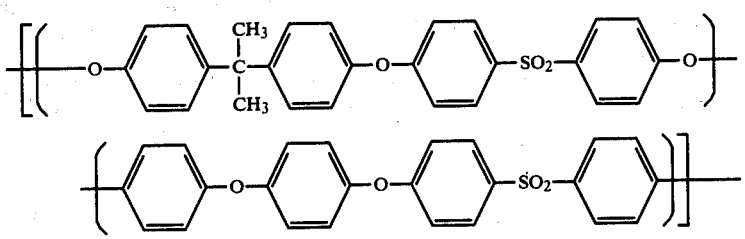

The total preparation time for this example exclusive of polymer recovery and drying was 2 hours.

EXAMPLE 37 (PROCESS IIA)

Example 27 was duplicated except that in place of 4,4'-dichlorodiphenylsulfone, 61.17 g of 1,4-bis-(p-chloro-N-methyl-benzenesulfonamido)butane, having the formula

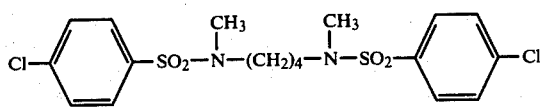

(melting point 179.5°–180.5° C.) and prepared by the reaction of potassium p-chloro-N-methyl-benzenesulfonamide with 1,4-dichlorobutane, was used, and the reaction time was 2 hours at about 160° C. The isolated polymer had a reduced viscosity in chloroform at 25° C. of 0.85. The polymer was composed of recurring units having the formula

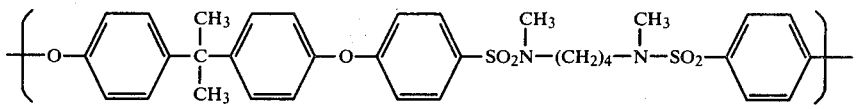

A film molded at 220° C. exhibited the following properties
Tensile Modulus: 275,000 psi
Tensile Strength: 8,000 psi
Elongation: 6%
Pendulum Impact: 55 ft. lb./in$^3$

EXAMPLE 38 (PROCESS IIA)

Example 27 was duplicated except that in place of 4,4'-dichlorodiphenylsulfone, 57.2 of piperazine bis-p-chlorobenzenesulfonamide having the formula

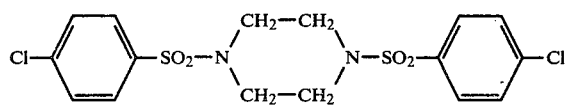

(melting point 324°–325° C.) and prepared by reacting p-chlorobenzenesulfonyl) chloride with piperazine, was used. The polymerization time was 1 hour at 160°–170° C. The polymer crystallized out on cooling the reaction mixture and exhibited a melting point of 255°–260° C. and an RV in p-chlorophenol at 47° C. of 0.84. The polymer was composed of recurring units having the formula

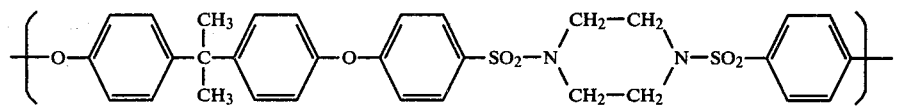

A pressed film had a tensile modulus of 350,000 psi.

Because the thermoplastic polyarylene polyethers prepared according to this invention have excellent physical, mechanical, chemical, electrical, and thermal properties, their uses are many and varied. For example, they can be used in molding formulations either alone or mixed with various fillers and/or additives to make molded parts such as gears, chain valves, water heater dip tubes, camera cases, flash bulb sockets, ratchets, cams, impact parts, gaskets valve seats and the like. They can be used to prepared molded, calendered or extruded articles such as films, sheets, for projection transparencies for example, bars, rods, coatings, threads, filaments, tapes, and the like. They are useful in electrical applications such as in cable terminals, terminal blocks, diode sticks, wire and cable insulation, and the like. They can also be used as an encapsulation material for electrical insulation such as a wire enamel, potting compound and the like. Their excellent electrical properties make laminates or sheets of these polymers useful for electrical equipment such as printed circuits, small appliance housings, slot wedges in the armature of an electrical motor, and the like. The polyarylene polyethers of this invention are useful in electrical applications such as circuit breaker components, coil bobins, thermostats, buglar alarms, timer and switch, housings for computers, meter housings, insulating bushings, terminal blocks, and the like, in electronic applications such as connectors, integrated circuit carriers, TV tube field controls, telephone hand sets, voltage rectifier sockets, turn table and phonograph components and the like, in appliance applications such as knife handles, coffee pot handles, lids and liners, sight glasses, kitchen range knobs and the like, and in automotive and aircraft applications such as ignition and electrical components, interior components, duct work and the like.

What is claimed is:

1. A substantially linear thermoplastic polyarylene polyether composed of recurring units of the general formula:

$$-\!\!+\!\!O\!-\!\!E\!-\!\!O\!-\!\!E'\!\!+\!\!-$$

where E is the residuum of a dihydric phenol and E' is the residuum of a benzenoid compound having an electron withdrawing group in at least one of the positions ortho and para to the valence bonds, having a sigma* value sufficient to activate halogens in the said valence positions to a level adequate to react with an alkali metal phenolate; wherein both of said residua are valently bonded to ether oxygens through aromatic carbon atoms, with the proviso that E may not be the residuum of a bis(hydroxyphenyl) sulfone where E' is the residuum of bis(halophenyl) sulfone and with the further proviso that E may not be the residuum of hydroxybenzohydroxyphenone when E' is the residuum of halobenzohalophenone.

2. A substantially linear thermoplastic polyarylene polyether as described in claim 1 wherein E is a polynuclear residuum in which both valence bonds to ether oxygens are attached to aromatic carbon atoms of different aromatic nuclei.

3. A substantially linear thermoplastic polyarylene polyether as described in claim 1 wherein E is a mononuclear residuum.

4. A substantially linear thermoplastic polyarylene polyether as described in claim 2 or claim 3 in which E' is a polynuclear residuum in which both valence bonds to ether oxygens are attached to aromatic carbon atoms of different aromatic nuclei.

5. A substantially linear thermoplastic polyarylene polyether as described in claim 2 or claim 3 wherein E' is a mononuclear residuum.

6. A substantially linear thermoplastic polyarylene polyether as described in claim 3 or claim 5 wherein said inert electron withdrawing group is nitro, cyano phenylsulfone, trifluoromethyl or nitroso.

7. The process for preparing substantially linear polyarylene polyethers which comprises reacting essentially stoichiometric amounts of an alkali metal double salt of a dihydric phenol with a dihalobenzenoid compound wherein said halogen atoms are activated by an inert electron withdrawing group in at least one of the positions ortho and para to the said halogen atoms to a level sufficient to react with said salt.

8. A substantially linear thermoplastic polyarylene polyether which comprises the reaction product of essentially stoichiometric amounts of an alkali metal double salt of one or more dihydric phenol compounds and one or more dihhalobenzenoid compounds wherein said halogen atoms are activated by an inert electron withdrawing group in at least one of the positions ortho and para to the said halogen atoms to a level sufficient to react with said salt.

9. The process for preparing substantially linear polyarylene polyethers which comprises combining a dihydric phenol and at least two equivalents of an alkali metal base followed by addition of an essentially stoichiometric amount of a dihalobenzenoid compound wherein the halogen substituents of said dihalobenzenoid compound are activated by an inert electron withdrawing group in at least one position ortho or para to the said halogen substituents to a level sufficient to react with an alkali metal salt of a dihydric phenol compound.

10. A substantially linear thermoplastic polyarylene polyether composed of recurring units of the general formula:

$$+O-E-O-E'+$$

where E is the residuum of a dihydric phenol and E' is the residuum of a benzenoid compound having an electron withdrawing group in at least one of the positions ortho and para to the valence bonds, having a sigma* value sufficient to activate halogens in the said valence positions to a level adequate to react with an alkali metal phenolate; wherein both of said residua are valently bonded to ether oxygens through aromatic carbon atoms, with the proviso that E may not be the residuum of a bis(hydroxyphenyl) sulfone where E' is the residuum of bis(halophenyl) sulfone.

* * * * *